United States Patent Office 3,827,888
Patented Aug. 6, 1974

3,827,888
APPARATUS AND PROCESS FOR COMBINING CHEMICALLY COMPATIBLE SOLUTIONS
James P. Terwilliger, Anthony D. Gingello and John R. Tinney, Rochester, N.Y., assignors to Eastman Kodak Company, Rochester, N.Y.
Filed Mar. 6, 1972, Ser. No. 231,841
Int. Cl. B01f 7/08; G03c 1/02, 1/28
U.S. Cl. 96—107                                    4 Claims

ABSTRACT OF THE DISCLOSURE

An apparatus and process are disclosed in which an emulsion and an addenda sensitizer solution are directed as separate flows to a common junction where the flows are intermixed into a common flow upon coming into contact. The common flow of emulsion and addenda sensitizer solution is then moved through an extended path which includes means for heating the emulsion to a predetermined temperature and maintaining it at said temperature for a predetermined period of time and means for cooling the common flow very rapidly, thereby finishing the emulsion and providing an emulsion of uniform sensitization. While the emulsion is being moved through the conduit which forms and defines the extended path, it is being mixed continuously by a continuous series of elements arranged within and throughout the full length of the conduit from the common junction to an outlet located beyond the cooling means.

FIELD OF THE INVENTION

The present invention relates to an apparatus and process for combining at least two chemically compatible solutions and, more particularly, to combining on a continuous basis and at a rapid rate a photographic emulsion with an addenda solution to produce an emulsion having desired sensitometric characteristics.

DESCRIPTION OF THE PRIOR ART

It is well known to finish a large batch of an emulsion by adding a prescribed amount of chemical sensitizer to the batch as it is heated and maintained at a desired temperature for a predetermined period of time to effect the finishing operation and then chilling the emulsion as rapidly as possible in order to halt the chemical sensitization action. While the emulsion is being heated, it is stirred with maximum turbulence in order to obtain uniform intermixture of the emulsion and sensitizer, as well as uniform heating thereof.

There are several disadvantages inherent in this batch type of finishing operation. For example, the batch method for finishing a photographic emulsion is usually accomplished by mixing the emulsion and the addenda sensitizer solution in a jacketed kettle that is heated to a temperature which will produce the required finishing of the emulsion. Considerable time is consumed in heating such a kettle to the optimum finishing temperature. The kettle is usually heated by steam which is circulated through the walls of the kettle and, as a result, violent agitation of the solution is required not only to thoroughly mix the emulsion and the addenda sensitizer solution but also to maintain a generally uniform and constant temperature throughout the entire contents of the kettle. With scaled-up batch operations of this type, the low surface area to volume ratio ($l^2/l^3$) results in a very inefficient transfer of heat from the walls of the kettle to the emulsion mixture therein.

In a system such as that described above only a single batch of emulsion can be finished during a single operation. The kettle containing the emulsion must be heated to the finishing temperature at a specified rate maintained at that temperature for a predetermined period of time, and then cooled as rapidly as possible. The emulsion mixture is then transferred to other containers and the kettle must then be cleaned thoroughly before being used again, even for the same type of emulsion having the same finish and sensitometric characteristics.

SUMMARY OF THE INVENTION

It is an object of the invention to provide an apparatus and process for combining at least two chemically compatible solutions at a greatly increased rate of speed and at which speed a uniform and thorough mixture can be made.

It is another object of the invention to provide an apparatus and process for the rapid finishing of a photographic emulsion in which the emulsion is uniformly sensitized in a much shorter period of time than heretofore possible.

It is yet another object of the invention to provide an apparatus and process for the rapid finishing of a photographic emulsion in which higher temperatures and higher rates of emulsion flow can be used to obtain uniform chemical sensitization of the emulsion.

It is still another object of the invention to provide an apparatus and process for the uniform chemical sensitization of a photographic emulsion in which fewer steps are required in the manufacturing procedure, thereby resulting in a saving of time, labor cost and equipment.

The above objects and advantages of the invention are attained by an apparatus and process in which an emulsion and an addenda sensitizer solution are directed as separate flows to a common junction where the flows are intermixed into a common flow upon coming into contact. The common flow of emulsion and addenda sensitizer solution is then moved through an extended path which includes means for heating the emulsion to a predetermined temperature and maintaining it at said temperature for a predetermined period of time and means for cooling the common flow very rapidly, thereby finishing the emulsion and providing an emulsion of uniform sensitization. While the emulsion is being moved through the conduit which forms and defines the extended path, it is being mixed continuously by a continuous series of elements arranged within the conduit and throughout the full length of the conduit from the common junction to an outlet located beyond the cooling means.

In the apparatus and process in accordance with the invention, the addenda sensitizing solution can be added continuously to the emulsion and the rate of flow of each solution can be controlled to provide the necessary ratio of solutions to produce an emulsion having the required sensitometric characteristics. With the use of static in-line mixing elements in the conduit forming the extended path, plug flow of the mixture is obtained; and heat transfer is facilitated in both the heating and cooling steps of the process. The apparatus and process also permit the degree of chemical sensitization to be very accurately controlled merely by varying the flow rate of the emulsion and the sensitizer solution while keeping the temperature constant.

DESCRIPTION OF THE DRAWING

Reference is now made to the accompanying drawing wherein like numerals and reference characters designate like parts and wherein.

DESCRIPTION OF THE PREFERRED EMBODIMENTS

Figure 1:
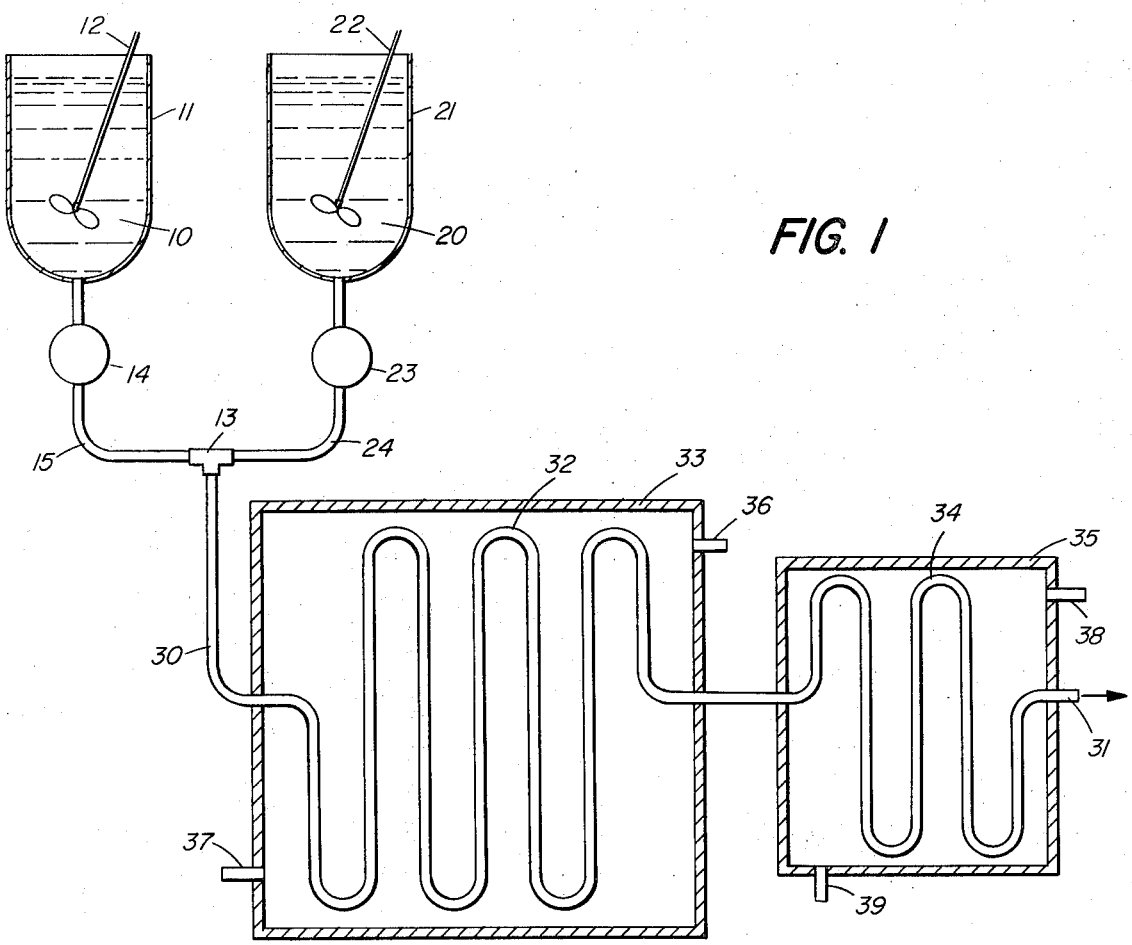
FIG. 1 is a schematic representation of apparatus for carrying out the process for combining at least two chemically compatible solutions in accordance with the invention.

With particular reference to FIG. 1, the emulsion 10 is contained in a receptacle 11 and continuously mixed or kept in agitation by means of a suitable mixing device designated by the numeral 12. The emulsion 10 is fed to a mixing T 13 by means of a gear pump 14 that is arranged in the line 15.

The addenda solution to be added to the emulsion is designated by the numeral 20 and is contained in a receptacle 21. The addenda solution 20 is maintained in a state of agitation by a mixing device generally designated by the numeral 22. A gear pump 23 that is arranged in a line 24 feeds the agenda solution to the mixing T 13 at the desired rate of flow. While the solutions being combined into a common flow at mixing T 13 are described as a photographic emulsion and an addenda solution, such as a sensitizer, the apparatus and process can be used to combine two or more chemically compatible solutions in much the same manner as about to be described with respect to the rapid finishing of a photographic emulsion. The invention, therefore, is not and should not be considered as being applicable only to sensitizing or finishing a photographic emulsion.

Conduit 30 provides an extended path for the flow of the emulsion and addenda solution from the mixing T 13 to an outlet designated generally by the numeral 31. As shown schematically in FIG. 1, the conduit 30 is formed into a first series of loops 32 that are contained within an enclosure 33, and a second series of loops 34 that are contained within an enclosure 35. In the preparation of a photographic emulsion in which the addenda solution contains sensitizers, the enclosure 33 is connected to a suitable media to provide heat whereby the common flow within the loops 32 will be maintained at a predetermined temperature for a period of time in accordance with flow time as determined by the length of the path comprising loops 32. Such a media for maintaining the temperature can be steam or hot water that is introduced into enclosure 33 by the inlet pipe 36 and withdrawn at the outlet pipe 37. The water or steam can be in a circulating system so that the flow into and out of enclosure 33 is continuous. Also, suitable means can be provided in the enclosure 33 to monitor the temperature within the enclosure as well as that of the solution. Other types of heating media can be provided, such as, hot water, steam or electrical coils surrounding the loops of conduit 30 or arranged in the enclosure 33 relative to loops 32, as well as circulating hot air. Obviously, the heating media will also be dependent on the solutions to be combined and mixed.

The enclosure 35 is provided with an inlet pipe 38 and an outlet pipe 39 by which cold water or another type of coolant can be introduced into the enclosure to rapidly chill the emulsion contained within the loops 34. As in enclosure 33, suitable means can be provided within enclosure 35 to monitor the temperature within the enclosure and of the coolant so as to maintain the proper chilling temperature for the emulsion. Also, the coolant can be utilized in many ways to effect the heat transfer from the emulsion in the loops 34 to the coolant.

Figure 2:
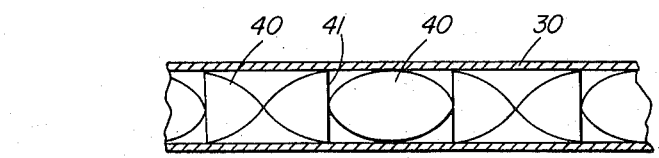
FIG. 2 is a partial vertical section through a portion of conduit forming the extended path for the common flow of the solutions and showing the arrangement of the individual elements which provide a static in-line mixing action.
Figure 3:
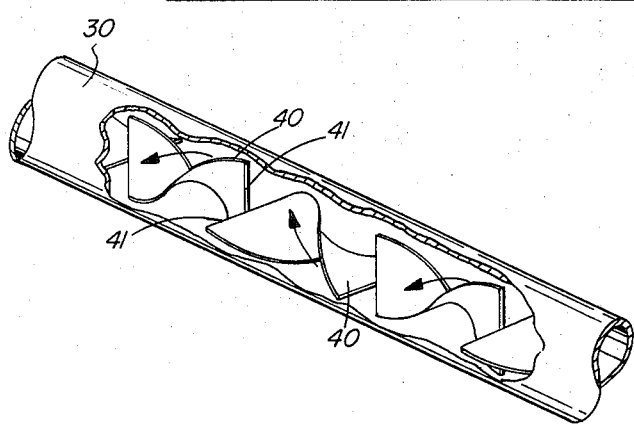
FIG. 3 is a perspective view of the elements shown in FIG. 2 for attaining the static in-line mixing action.

The conduit 30 throughout its entire length from the mixing T 13 to the outlet 31 is provided with a series of metal strips 40 which have been twisted through an angle of about 180°. These strips are arranged in an alternating sequence of right-hand and left-hand twist with their contacting edges 41 at about 90° to one another, see FIGS. 2 and 3. The arrangement of the edges 41 is shown more clearly in FIG. 3. With such an arrangement of twisted strips or elements in the conduit 30, continuous mixing takes place whereby the flow of emulsion at the wall of the conduit 30 is moved into the center of the flow by one strip and the emulsion at the center of the flow is moved toward the wall by the next strip. With this continuous reversal of emulsion movement, a more rapid transfer of heat takes place in enclosures 33 and 35. As a result, less time is required to heat the flow and to cool the flow to the required temperatures, and the rate of flow can be increased considerably thereby speeding up the actual production of the finished emulsion. From the examples set forth hereinbelow, it will be evident that there is no consistent nor significant difference in sensitometric characteristics between those emulsions finished in a conventional manner (batch method) and those finished in accordance with the apparatus and process comprising the invention (continuous method) but that such finishing is effected with a considerable reduction in time of operation.

A number of examples are set forth hereinbelow and clearly show the differences in the finishing time required for a batch method as compared to a continuous method, both with and without static in-line mixing of the emulsion. These examples set forth operable conditions for the apparatus and process described hereinabove but are not to be considered in any way as defining the scope of the invention.

EXAMPLE 1

Continuous finishing operations are performed by pumping an emulsion flow through about 40 feet of ¼″ O.D. conduit or tubing immersed in a constant temperature bath that is maintained at a prescribed temperature. No static in-line mixing elements are present in the conduit forming the path between the mixing T and the outlet. An emulsion is combined with a chemical sensitizer and then held at a temperature of about 35–40° C. The 40 feet of tubing has over sixty 180° bends and has an internal volume of about 200 milliliters, the mean residence time of the emulsion in the bath or heat exchanger being set by regulating the flow rate. During a particular finishing operation, a desired flow rate is set and the output emulsion stream for at least one residence time is discarded.

The same emulsion is also finished by the well-known prior art batch method. Such batch finishes are run by raising the temperature of the emulsion to the desired level. The same sensitizer is added to the emulsion and this point is taken as the zero time base. Samples of the finished emulsion obtained by both methods are withdrawn and coated on a suitable film support. A sample of each coating is then exposed on an intensity screen sensitometer and developed for 6 minutes in Kodak Developer D–19. The sample is fixed, washed and dried. The sensiometric results obtained by both the batch method and the continuous method (without static in-line mixing elements) of chemical sensitization are set forth in the following table:

TABLE I

| Test | Temp. °C. | Relative speed* | Gamma | Fog | Time (min.) |
|---|---|---|---|---|---|
| Batch method | | | | | |
| 1 | 65 | 45 | 5.95 | .08 | 35.0 |
| 2 | 75 | 52 | 5.75 | .08 | 14.2 |
| 3 | 85 | 52 | 6.50 | .08 | 6.3 |
| Continuous method | | | | | |
| 4 | 65 | 35 | 6.40 | .08 | 14.0 |
| 5 | 75 | 30 | 4.25 | .08 | 5.4 |
| 6 | 85 | 28 | 5.00 | .08 | 2.0 |

*Relative speed measured at 0.3 above $D_{min}$.

It is believed that the above variations in chemical sensitization observed with the continuous finishing process are due to the predominantly laminar flow of emulsion that takes place in the conduit; that is, for a stream-in-laminar flow, the emulsion in the center of the conduit passes through more rapidly than the emulsion near the walls which is, therefore, retained in the system for a longer period of time. Thus, the effluent is non-homogeneous and gives rise to a significant disparity in sensitometric behavior for the emulsions finished at an average residence time in the heat exchanger and those finished for the same time in a single batch. Temperature distribution measurements showed that the emulsion did not reach the finishing temperature immediately upon entering the heat exchanger, but "ramped-up" exponentially to the desired temperature within 10–15% of the total path length of the conduit in said heat exchanger. The extent of temperature rise per unit length is inversely related to the flow rate.

EXAMPLE 2

The apparatus is the same as that described in Example 1, except that the conduit is provided with static in-line mixing elements arranged therein from the mixing T to the outlet. The emulsion and sensitizer solution is the same as that used in Example 1. This Example demonstrates that the predominantly stream-in-laminar flow observed in Example 1 is practically eliminated by the addition of the static in-line mixing device and, as a result, consistent sensitomeric responses are realized. Table II hereinbelow lists the sensitometric results obtained from a reduction sensitized silver bromide gelatin emulsion finished to a gross fog of 0.08 and 0.16 by both a conventional batch finishing method and a continuous finishing apparatus with a heat exchanger and static in-line mixing device as described hereinabove:

TABLE II

| Test | Temp., °C. | Relative speed* | Gamma | Fog | Time (min.) |
|---|---|---|---|---|---|
| Batch method | | | | | |
| 1 | 65 | 282 | 4.70 | .08 | 34.0 |
| 2 | 75 | 282 | 4.84 | .08 | 12.2 |
| 3 | 85 | 240 | 5.00 | .08 | 4.3 |
| 4 | 65 | 331 | 4.53 | .16 | 37.6 |
| 5 | 75 | 324 | 4.45 | .16 | 13.4 |
| 6 | 85 | 269 | 5.65 | .16 | 4.8 |
| Continuous method | | | | | |
| 7 | 75 | 224 | 4.20 | .08 | 10.7 |
| 8 | 85 | 257 | 4.60 | .08 | 4.3 |
| 9 | 75 | 269 | 4.37 | .16 | 11.9 |
| 10 | 85 | 269 | 4.10 | .16 | 4.8 |

*1 sec. exposure 500W source (3,000° K.); Developer: Kodak D-19 (6 min.); Relative speed measured at 0.3 above $D_{min}$.

A comparison of the above sensitometric data shows no consistent or significant difference between those emulsions finished in the conventional manner and those finished in the continuous finishing apparatus having a static in-line mixing device. Temperature distribution measurements show that within a distance of 1.8% (0.72 feet) into the heat exchanger, the emulsion reached the finishing temperature regardless of the flow rate or the entry temperature of the emulsion. The addition of the static in-line mixing device increased the effective heat transfer coefficient by at least 10 times and essentially eliminated the entrance temperature ramp. Steady state output tests showed that the effluent emulsion reached a consistent sensitometric level within 1 to 2 residence times after a change in flow rate.

EXAMPLE 3

A fast, coarse-grained, monodispersed silver bromoiodide emulsion is sulfur and gold sensitized by the well-known batch method of chemically sensitizing an emulsion. The same emulsion is chemically sensitized by a continuous method in accordance with the invention and Example 2 hereinabove. The sensitometric results are tabulated hereinbelow:

TABLE III

| Test | Temp., °C. | Relative speed* | Gamma | Fog | Time (min.) |
|---|---|---|---|---|---|
| Batch method | | | | | |
| 1 | 70 | 100 | 2.45 | .16 | 25.0 |
| Continuous method | | | | | |
| 2 | 85 | 123 | 2.17 | .16 | 8.0 |
| 3 | 90 | 123 | 2.67 | .12 | 4.0 |
| 4 | 95 | 112 | 2.45 | .12 | 2.0 |

*1/60 sec. exposure 500W source (3,000° K.); Developer: Elon-hydroquinone (6 min.). Relative speed measured at 0.30 above $D_{min}$.

The above results show that this emulsion can be chemically sensitized to a higher speed in much less time and with no substantial increase in fog by the continuous method.

EXAMPLE 4

Similar tests carried out with a high speed, coarse-grained, polydispersed silver bromoiodide emulsion produced the sensitometric data listed hereinbelow:

TABLE IV

| Test | Temp., °C. | Relative speed* | Gamma | Fog | Time (min.) |
|---|---|---|---|---|---|
| Batch method | | | | | |
| 1 | 70 | 100 | 0.92 | .16 | 20.0 |
| Continuous method | | | | | |
| 2 | 85 | 85 | 0.92 | .08 | 2.0 |
| 3 | 85 | 141 | 1.05 | .12 | 4.0 |
| 4 | 90 | 85 | 0.92 | .12 | 1.5 |
| 5 | 90 | 105 | 0.92 | .14 | 2.0 |
| 6 | 95 | 85 | 0.82 | .12 | 1.0 |
| 7 | 95 | 120 | 0.95 | .14 | 1.5 |

*1/25 sec. exposure to 500W source (2,750° k.; Kodak Developer DK-50 (5 min.); Relative speed measured at 0.30 above $D_{min}$.

These tests also demonstrate that an emulsion can be chemically sensitized to the same degree of photographic sensitivity in much less time and at a higher temperature than can be employed in a batch method, because the apparatus used in the latter case cannot be heated or cooled within the prescribed limits in such short time.

The emulsion sensitization can be monitored by a liquid emulsion sensitometer of the type disclosed in U.S. patent application, Ser. No. 108,485, filed Jan. 21, 1971, in the name of David C. Seelbinder and entitled A Process and Apparatus for Sensitometrically Testing a Liquid, Photosensitive Emulsion. The degree of chemical sensitization can be controlled by a suitable feed back system to produce the desired photographic characteristics. The feed back system would be one in which the pumps 14 and 23 are electrically controlled to give the desired flow rate at a specific emulsion to chemical sensitizer flow rate ratio in accordance with the emulsion characteristics, thereby insuring the proper combination of emulsion to chemical sensitizer level. In addition, the temperatures within enclosures 33 and 35 can also be monitored and controlled to provide temperatures that will produce an emulsion having prescribed sensitometric characteristics.

The invention has been described in detail with particular reference to preferred embodiments thereof, but it will be understood that variations and modifications can be effected within the spirit and scope of the invention.

We claim:
1. A continuous process for the chemical sensitization of photographic emulsions, comprising the steps of:
   simultaneously supplying separate flows of an emulsion and of a sensitizer solution to a common junction where the flows are intermixed into a common flow upon coming into contact;
   moving the common flow through an extended path of treatment; and
   continuously mixing the common flow as it is moved through the path with maximum turbulence to produce a uniformly sensitized emulsion.

2. The process in accordance with claim 1 wherein the path of treatment includes at least one temperature varying device through which the common flow is moved.

3. The process in accordance with claim 1 wherein the path of treatment includes tandemly arranged heating and cooling devices through which the common flow is moved.

4. The process in accordance with claim 3 wherein the heating device maintains the common flow at a temperature between about 50 to 95° C. and the cooling device reduces the common flow to a temperature of about 35-40° C.

References Cited

UNITED STATES PATENTS 3,773,057   5/1973   Kahoun _____ 259—4

RONALD H. SMITH, Primary Examiner

A. T. SURO PICO, Assistant Examiner

U.S. Cl. X.R.

96—94 R; 259—4